(12) United States Patent
Levin

(10) Patent No.: US 7,575,116 B2
(45) Date of Patent: Aug. 18, 2009

(54) PROTECTIVE COVER FOR KEYBOARD TRAY AND MOUSE PAD

(76) Inventor: Robert M. Levin, 9126 Briarwood Farms Ct., Fairfax, VA (US) 22031

(*) Notice: Subject to any disclaimer, the term of this patent is extended or adjusted under 35 U.S.C. 154(b) by 1073 days.

(21) Appl. No.: 10/461,545

(22) Filed: Jun. 16, 2003

(65) Prior Publication Data
US 2004/0251152 A1 Dec. 16, 2004

(51) Int. Cl.
B65D 85/00 (2006.01)
(52) U.S. Cl. .................................................. 206/320
(58) Field of Classification Search ................ 206/307, 206/320; 150/154, 165, 158, 162; 345/165; 383/210; 312/208.1; 211/88.01; 190/902, 190/26
See application file for complete search history.

(56) References Cited

U.S. PATENT DOCUMENTS

| | | | | |
|---|---|---|---|---|
| 2,386,501 A | * | 10/1945 | Pearson | 126/266 |
| 4,786,120 A | * | 11/1988 | Sparks et al. | 312/208.3 |
| 5,160,001 A | * | 11/1992 | Marceau | 190/102 |
| 5,638,955 A | * | 6/1997 | Calciano | 206/320 |
| 5,809,900 A | * | 9/1998 | Alexander et al. | 108/26 |
| 6,285,299 B1 | * | 9/2001 | King-DeBaun | 341/23 |
| 6,409,127 B1 | * | 6/2002 | VanderHeide et al. | 248/118 |

* cited by examiner

*Primary Examiner*—Bryon P Gehman
*Assistant Examiner*—Ernesto A Grano
(74) *Attorney, Agent, or Firm*—H. Jay Spiegel

(57) ABSTRACT

A protective cover is designed to be removably placed over the keyboard tray and mouse pad of a bracket system including an articulating bracket having a proximal end designed to be affixed to the undersurface of a desk top and a distal end to which the keyboard tray is mounted. The protective cover consists of a padded bag having an inner chamber sized to receive the keyboard tray and mouse pad, and a cover designed to close its access opening which consists of two flaps spaced by a recessed portion, with the recessed portion provided to allow the flaps to fold over to either side of the bracket. Each of the flaps has a releasable fastener designed to fasten the flaps in a closed configuration. Another releasable fastener is provided on the bracket and the bag so that the fastener halves can be releasably attached together to hold the bracket system in a folded configuration making it easy to transport.

15 Claims, 5 Drawing Sheets

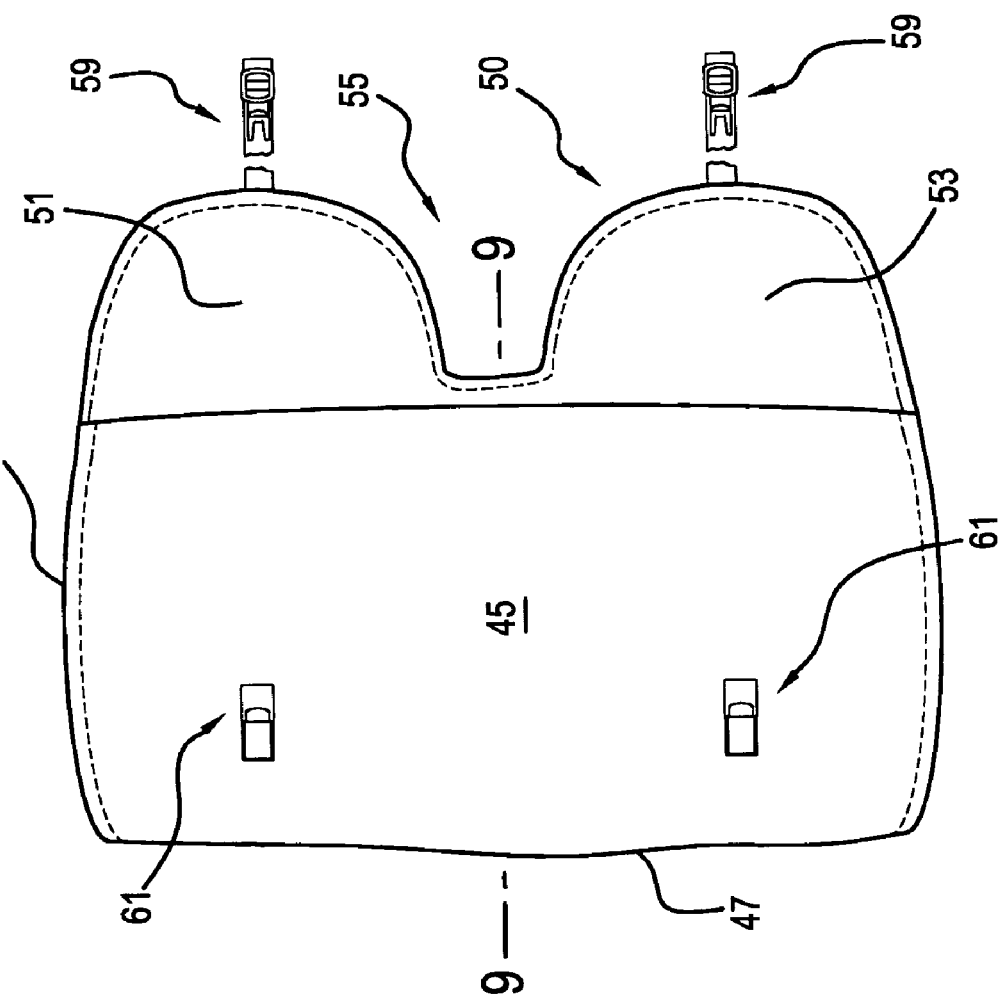
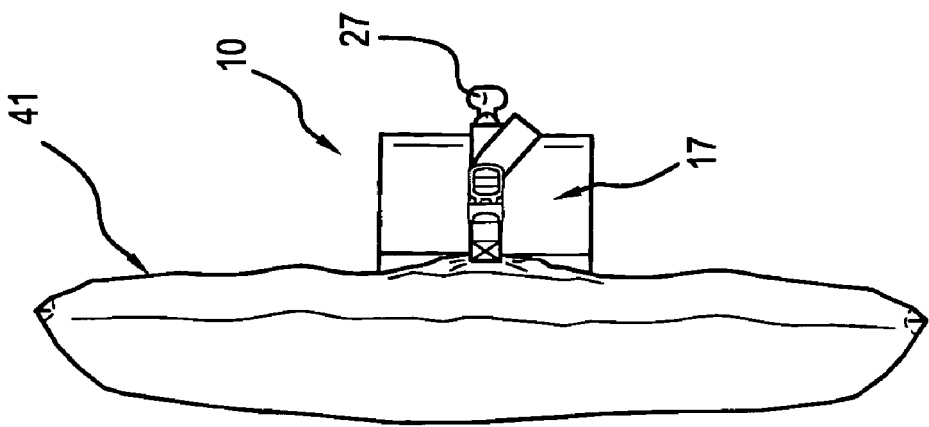

PROTECTIVE COVER FOR KEYBOARD TRAY AND MOUSE PAD

BACKGROUND OF THE INVENTION

The present invention relates to a protective cover for keyboard tray and mouse pad. As computers have become a common and necessary piece of equipment in the office and home, over the past decade, numerous industries have evolved to provide support equipment to be used in conjunction with the components of a computer to make the computer easier to use, ergonometrically adjustable, and easier to store when not in use.

One such industry is involved in the development of support devices designed to support computer keyboards while also providing a separate but connected adjustable mouse pad configured to be suspended slightly above or below a region of a keyboard as supported on its support. The more sophisticated such devices are mounted on a bracket including articulating arms and means for fastening the bracket on the undersurface of a desk top.

Companies that sell such bracket systems create demonstration samples that are used to demonstrate them to prospective customers. When such a bracket is actually used, the proximal end of the bracket (remote from the keyboard tray and mouse pad) is typically affixed to the undersurface of a desk top using wood or metal screws or, sometimes, bolts and nuts. Of course, when the salesman is demonstrating the bracket system, an attachment device must be provided to allow the system to be temporarily affixed to the desk top so that its use may be demonstrated without damaging the desk top itself. For this purpose, often, a temporary clamping device is mounted on the bracket which includes a clamping mechanism that may be applied and disengaged without damaging the desk top. With such a temporary clamping device so affixed to the bracket system, the salesman may easily demonstrate the device for a prospective customer.

In practice, it has been found that, when the salesman is transporting the bracket system with its keyboard tray and mouse pad, it is quite easy to damage or physically mar the keyboard tray and/or mouse pad with such damage detracting from the sales demonstration. Accordingly, a need has developed for some means that can be used to protect the keyboard tray and mouse pad from damage during transport but that may be easily removed to permit demonstration of the bracket system. Such a device advantageously would also assist in holding the bracket system in a configuration that permits easy transport.

It is with these needs in mind that the present invention was developed.

SUMMARY OF THE INVENTION

The present invention relates to a protective cover for keyboard tray and mouse pad. The present invention includes the following interrelated objects, aspects and features:

(1) In a first aspect of the present invention, the inventive cover is designed to be removably placed over the keyboard tray and mouse pad of a bracket system including articulating bracket arms having a proximal end designed to be affixed to the undersurface of a desk top and a distal end to which the keyboard tray is mounted with the mouse pad adjustably mounted on the keyboard tray.

(2) The protective cover consists of a padded bag having an inner chamber sized to receive the keyboard tray and mouse pad with the mouse pad pivoted to a position overlying or underlying the keyboard tray.

(3) The bag has a cover designed to close its access opening which consists of a flap having two flap portions spaced by an open area or space, with the open area or space provided to allow the flaps to fold over to either side of the bracket. Each of the flaps has a releasable fastening means designed to fasten the flaps in a closed configuration.

(4) In one aspect of the present invention, a demonstration bracket is fastened to one of the bracket arms to allow the bracket system to be demonstrated for a prospective customer without the requirement of screwing or bolting the bracket system to the undersurface of a desk top. Another releasable fastener is provided on the demonstration bracket and the bag so that the fastener halves can be releasably attached together to hold the bracket system in a folded configuration with the bag retained thereon making it easy to transport.

(5) In the folded position of the bracket system and with the bag affixed over the keyboard tray and mouse pad, the salesman may grab a bent portion of the demonstration bracket to carry the system with the protective cover to a location of demonstration.

Accordingly, it is a first object of the present invention to provide a protective cover for keyboard tray and mouse pad.

It is a further object of the present invention to provide such a protective cover that is made of a padded material to protect the keyboard tray and mouse pad from marring or other damage.

It is a still further object of the present invention to provide such a protective cover including releasable attachment means allowing the cover to retain the associated bracket system in a folded configuration.

It is a still further object of the present invention to provide such a protective cover with a closure flap made up of two flap portions separated from one another to permit the flap portions to be folded over the protective cover to either side of the bracket.

It is a still further object of the present invention to provide such a protective cover that permits a salesman to easily transport a bracket system with keyboard tray and mouse pad attached thereto so that the system may easily be demonstrated for a prospective customer while preventing damage to the keyboard tray and mouse pad.

These and other objects, aspects and features of the present invention will be better understood from the following detailed description of the preferred embodiment when read in conjunction with the appended drawing figures.

BRIEF DESCRIPTION OF THE DRAWINGS

FIG. 7 shows an end view of the bracket system and protective cover.

FIG. 8 shows a bottom view of the protective cover in the open configuration.

SPECIFIC DESCRIPTION OF THE PREFERRED EMBODIMENT

Figure 1:
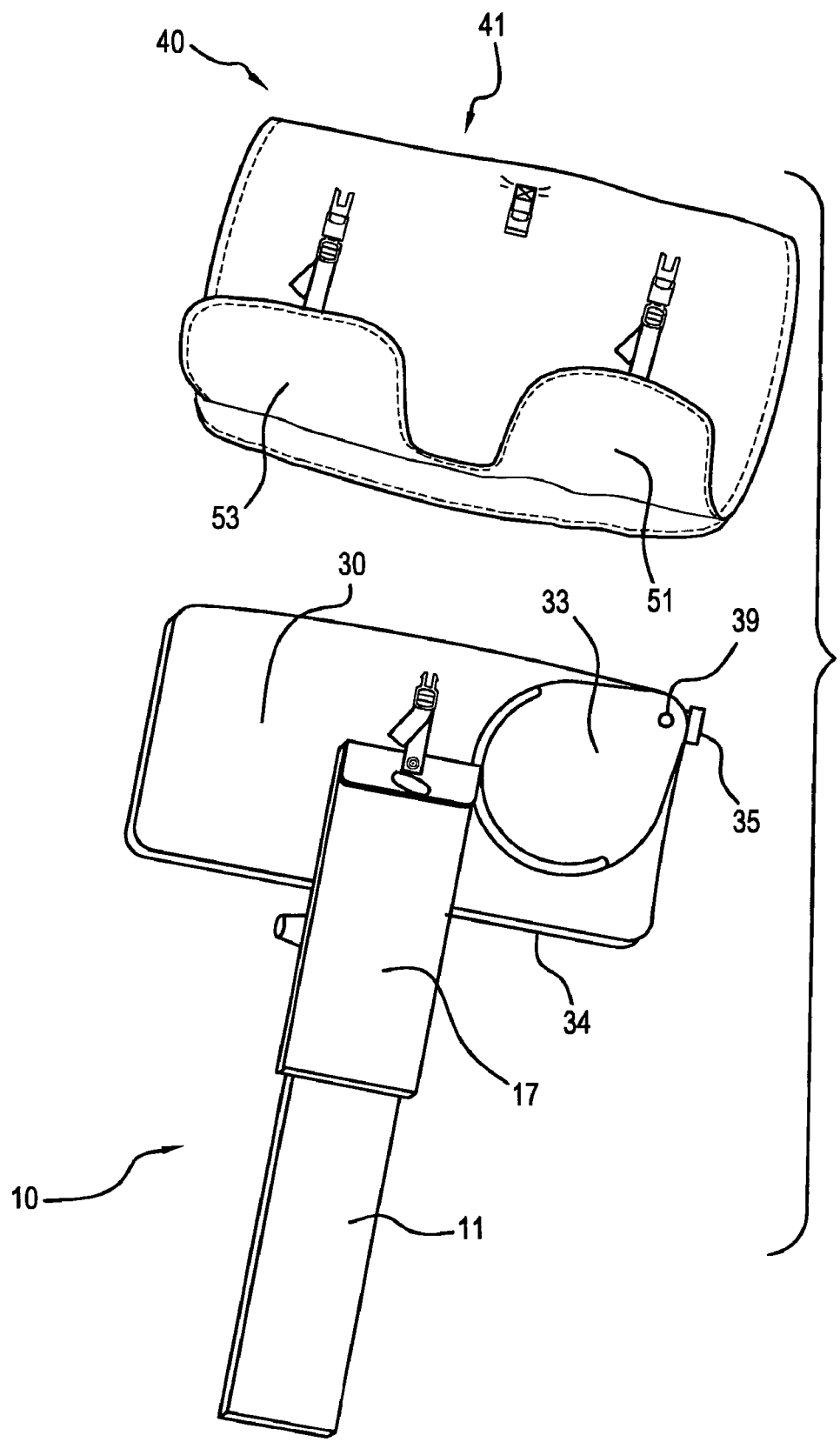
FIG. 1 shows an exploded top view of a bracket system and the protective cover in accordance with the teachings of the present invention.
Figure 2:
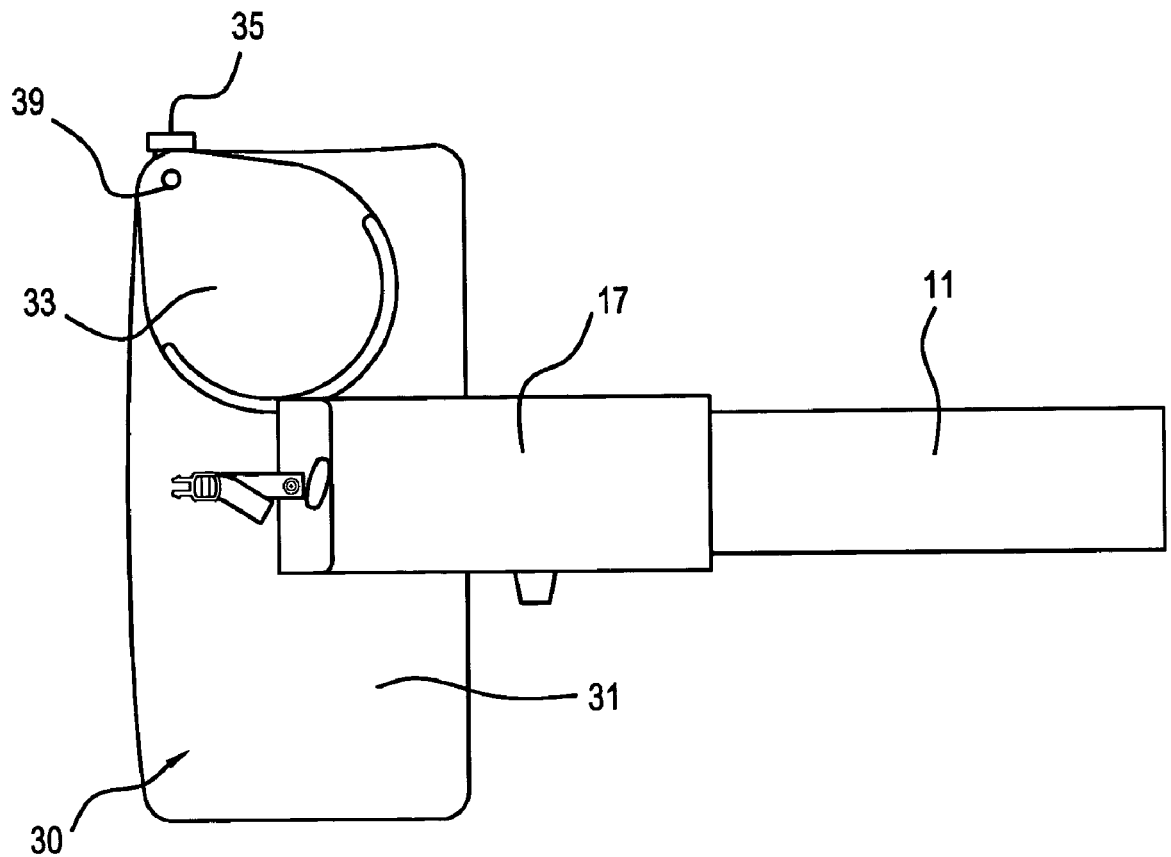
FIG. 2 shows a view of the bracket system similar to that of FIG. 1.
Figure 3:
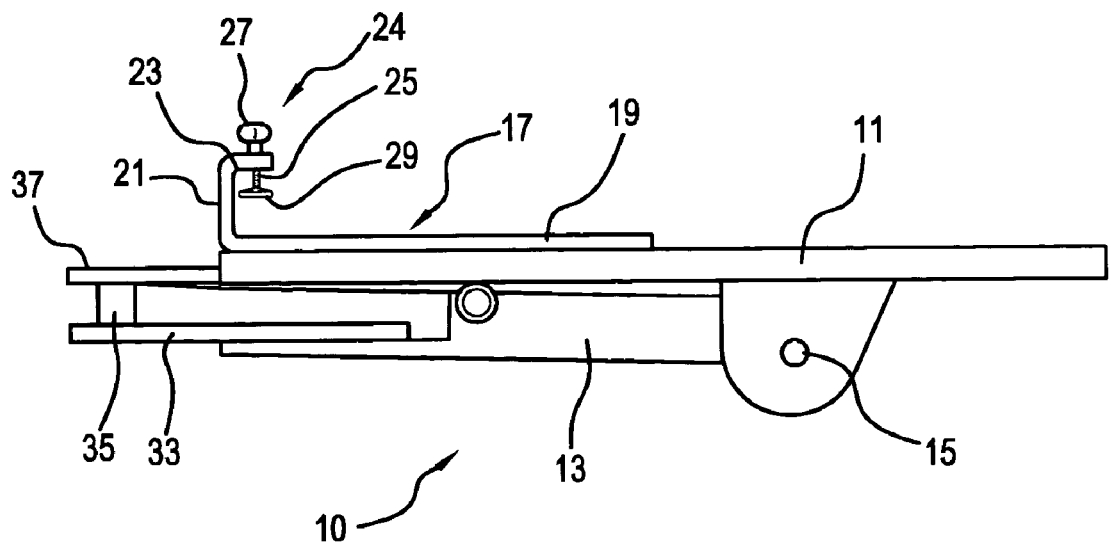
FIG. 3 shows a side view of the bracket system.

Reference is first made to FIGS. 1-3 for a description of certain details of the bracket system with which the inventive protective cover cooperates. The bracket system is generally designated by the reference numeral 10 and is seen to include bracket arms 11 and 13 articulatable about a pivot 15 (FIG. 3). A demonstration bracket 17 is fastened to the proximal end of the bracket arm 11 in any suitable manner and has a generally J-shaped configuration including a leg 19 fastened to the bracket arm 11, a perpendicular leg 21, and a further leg 23 perpendicular to the leg 21 and having a threaded opening therethrough (not shown) receiving a clamping member 24 including a threaded shaft 25 therethrough having a gripping portion 27 at one end and a clamping element 29 at the other end. As should be understood by those of ordinary skill in the art, the demonstration bracket is provided to allow the bracket arm 11 to be temporarily clamped on a work surface using the screw threaded clamping member 24 for that purpose.

As best seen in FIGS. 2 and 3, the distal end of the bracket arm 13 has attached thereto a keyboard tray 30 that is sized and configured to receive, on its upper surface 31, a computer keyboard (not shown). The keyboard tray 30 includes one or more fastening devices (not shown in detail) that are designed to facilitate releasable attachment of a mouse pad 33 in a variety of locations and orientations. These fastening devices include a bracket 35 that includes structure (not shown) allowing attachment to the undersurface 37 of the keyboard tray 30. While not forming a part of the present invention, typically, the mouse pad 33 is adjustable in a plurality of configurations with respect to the keyboard tray 30 including the ability to pivot about a pivot 39 as best seen in FIGS. 1 and 2.

Figure 5:
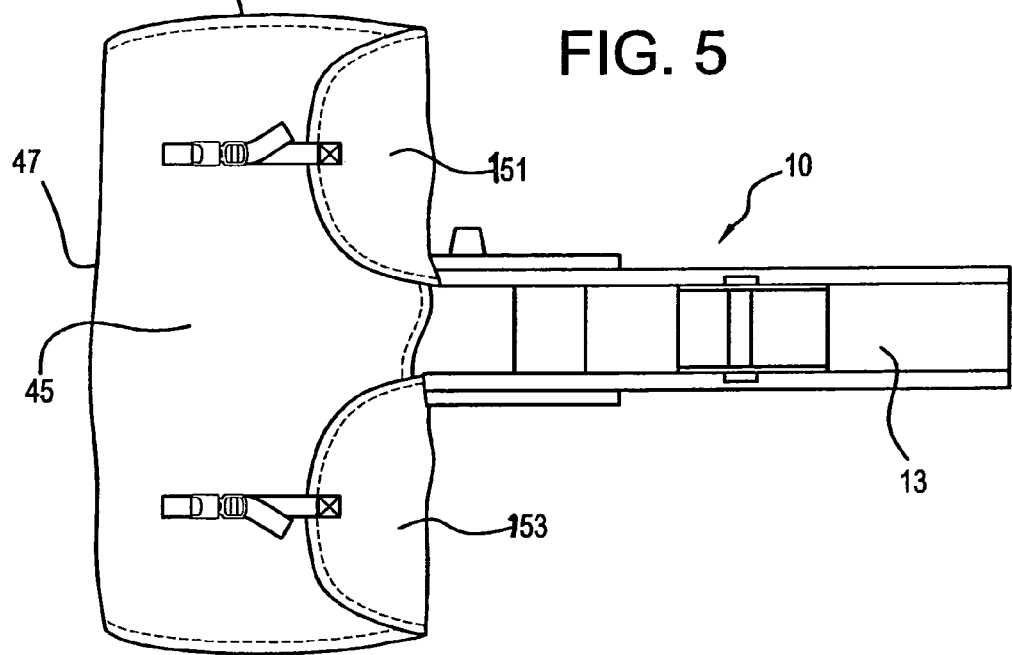
FIG. 5 shows a bottom view of the bracket system with the inventive protective cover releasably affixed thereto.

With reference to FIGS. 3 and 5, it should be understood that the bracket arm 13 may consist of a slide mechanism allowing the keyboard tray 30 to be reciprocated toward and away from the pivot 15 to allow adjustment of the distance of the keyboard tray 30 from a desk to which the system 10 is fastened.

Figure 9:
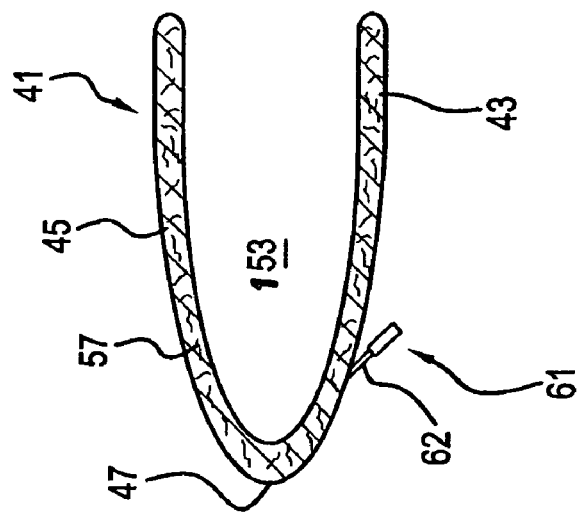
FIG. 9 shows a cross-sectional view along the line 9-9 of FIG. 8.

With reference, now, to FIGS. 1 and 4-9, the protective cover in accordance with the teachings of the present invention is generally designated by the reference numeral 40 and is seen to comprise a padded bag 41 having a top portion 43 and a bottom portion 45 which may, if desired, be formed of a single piece of material folded at the fold 47 and sewn together at side edges 49 and 151 to create an inner chamber 153 (FIG. 9). Extending from the portion 43 is a flap 50 (FIGS. 1, 5 and 8) consisting of flap portions 51 and 53 separated by an open space 55 (FIG. 8) for a purpose to be described in greater detail hereinafter.

As seen in FIG. 9, the bag 41 includes a desired degree of thickness provided by using a padded material including padding 57 (FIG. 9) to provide the bag 41 with its protective properties. Any suitable such material may suitably be employed including materials that are quilted or include two outer cloth surfaces separated by any desired padding or batting.

Each of the flap portions 51 and 53 has attached thereto one half 59 of a fastener member 58 with the portion 45 of the bag 41 carrying the other halves 61 that will be releasably attached to the first-mentioned halves 59 when the flap portions 51 and 53 are folded over in the configuration shown, for example, in FIGS. 1 and 5.

Figure 10:
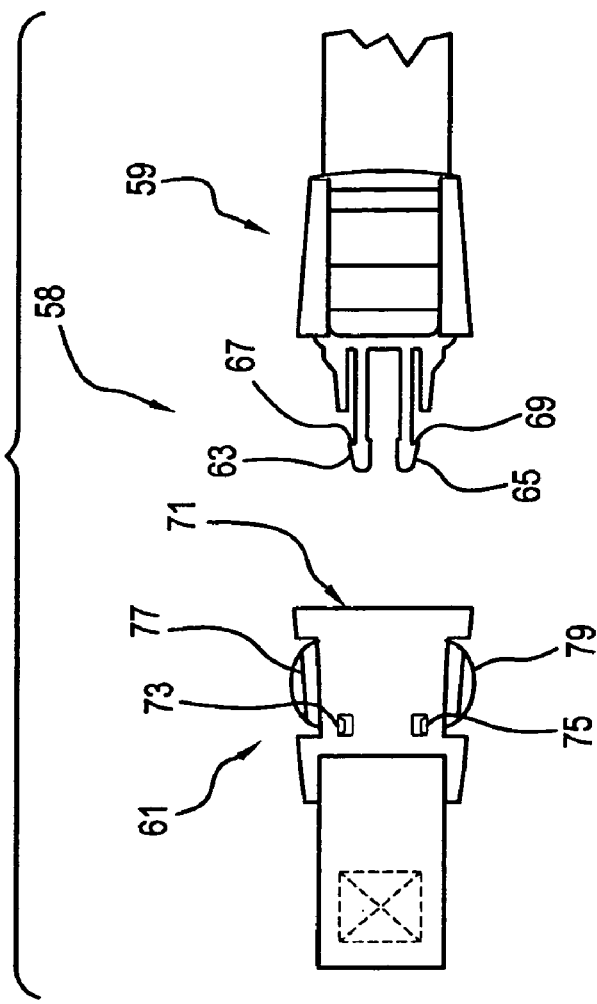
FIG. 10 shows an exploded top view of a releasable fastener usable in accordance with the teachings of the present invention.

FIG. 10 shows an example of a fastener 58 including the fastener halves 59 and 61. The fastener 58 has been found to be an effective means of holding the flaps 51 and 53 in the configuration shown, for example, in FIGS. 1 and 5. Any suitable fastener including two halves that may be releasably coupled together may suitably be employed in place of the fastener 58, such as snaps, hook and pile fastening means and others.

In the fastener example shown in FIG. 10, the fastener half 59 includes two extending legs 63, 65 that have shoulders 67 and 69, respectively, that cooperate with shoulders within a chamber 71 in the fastener half 61 (not shown in detail) but located in the areas underneath the depressions 73 and 75 to clamp the halves 59 and 61 together. When it is desired to release the halves 59 and 61, the user squeezes toward one another the release mechanisms 77 and 79 which causes the legs 63 and 65 to be squeezed toward one another, thereby releasing the shoulders 67 and 69 and permitting the halves 59 and 61 to be separated from one another to the position shown in FIG. 10. The specific details of the fastener 58 are well known and do not, in and of themselves, form a part of the present invention.

Figure 4:
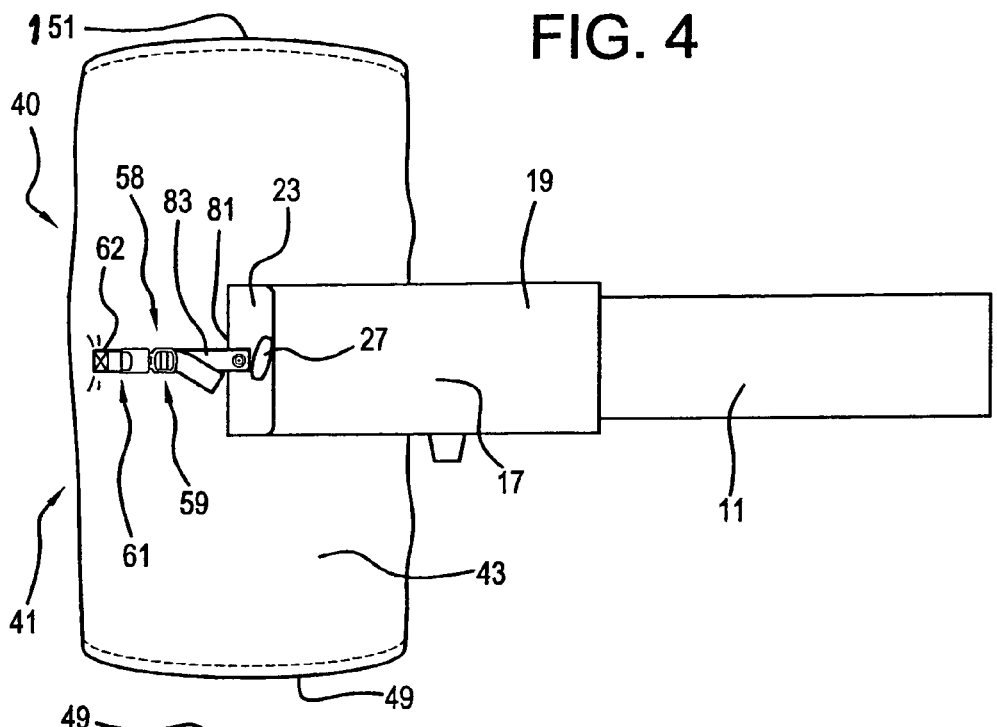
FIG. 4 shows a top view of the bracket system with the inventive protective cover releasably attached thereto.
Figure 6:
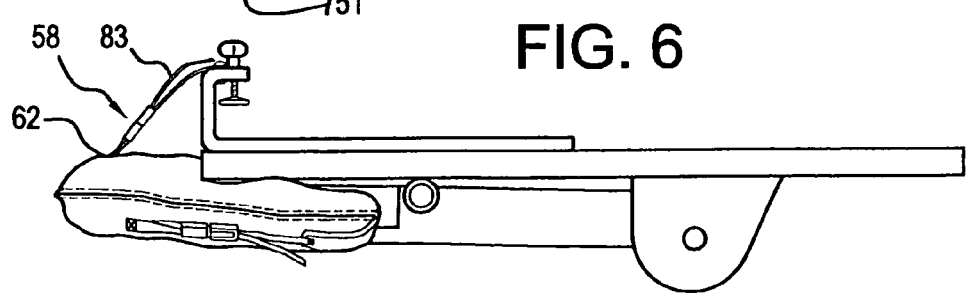
FIG. 6 shows a side view of the protective cover and bracket system.

With particular reference to FIGS. 4 and 6, an additional fastener 58 is provided to allow the bag 41 to be releasably affixed to the demonstration bracket 17. In this regard, a fastener half 61 is attached to the portion 43 of the bag 41 by a strap 62 (FIG. 9) sewn thereto. A fastener half 59 is attached to the leg 23 of the demonstration bracket 17 by any suitable fastener such as a threaded fastener 81 (FIG. 4) with a strap 83 connecting the fastener 81 to the fastener half 59.

With reference to FIG. 1, with the bag 41 in the position shown with respect to the bracket system 10, the flap portions 51 and 53 are opened to the position shown in FIG. 8. In that position, the bag 41 is slipped over an object comprising the keyboard tray 30 and mouse pad 33 until the flap portions 51 and 53 have gone past the edge 34 of the keyboard tray 30 (FIG. 1). In that configuration, the flap portions 51 and 53 are folded over and fastened as shown in FIG. 5 with the space 55 between the flap portions 51 and 53 being provided to allow a member of the rigid portion comprising brackets 11, 13 and 17 to pass through the space 55. With the bag 41 so affixed, with reference to FIGS. 2, 4 and 6, the fastener halves 59 and 61 of the fastener 58 that is located between the straps 62 and 83, which are affixed to the bag 41 and demonstration clamp 27, respectively, are engaged with one another to fasten the bag 41 to the demonstration bracket 17. This attachment prevents the bag 41 from being inadvertently removed from overlying relation to the keyboard tray 30 and mouse pad 33 even if the fasteners 58 affixed to the flap portions 51 and 53 are disengaged. In a further aspect, the straps 62 and 83 between the fastener 58 hold the bracket arms 11 and 13 in the configuration particularly shown in FIG. 6 to preclude the slide mechanism incorporated in the bracket 13 from operating.

In this configuration, also seen in FIG. 7, the salesman may grip the entire assembly by grasping the leg 23 of the demonstration bracket 17 and carry the entire assembly to a location of demonstration, without fear of causing any damage to the keyboard tray 30 or mouse pad 33 in the process. When it is desired to demonstrate the assembly 10, all the salesman need do is release the three fasteners 58 and remove the bag 41 from the assembly 10, thereby permitting the demonstration bracket 17 to be releasably affixed to a work surface and the slide mechanism in the bracket arm 13 to be extended to an appropriate location so that the entire assembly may be demonstrated for a prospective purchaser.

With particular reference to FIGS. 4-6, the bag 41 is shown assembled over the keyboard tray 30 in an orientation such that the flap portions 51 and 53 face away from the demonstration bracket 17 and the top portion 43 of the bag 41 faces the demonstration bracket 17 along with the fastener 58 on the top portion 43. If desired, this orientation may be reversed with no loss of function. In this regard, the bag 41 may be assembled over the keyboard tray 30 with the flap portions 51 and 53 facing toward the demonstration bracket 17 and with the top portion 43 of the bag and the fastener 58 mounted thereon facing away from the demonstration bracket. In order to fasten the fastener 58 on the top portion 43, in this orientation, the straps 62 and 83 are adjusted to lengthen them to accommodate to the slightly longer distance to the leg 23 of the demonstration bracket 17.

The bag 41 may be made of any suitable materials including plastics and fabrics, although suitable padded cloth materials are preferred.

As such, an invention has been disclosed in terms of a preferred embodiment thereof which fulfills each and every one of the objects of the invention as set forth hereinabove, and provides a new and useful protective cover for keyboard tray and mouse pad of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A protective cover in combination with an object, comprising:
   a) a flexible bag having top and bottom portions connected together to define an inner chamber accessible via an elongated opening;
   b) a flap attached to one of said top and bottom portions and movable between a first position permitting access to said chamber via said opening and a second position overlying said opening to close said chamber, said flap comprising first and second flap portions separated by an open space;
   c) a keyboard tray received within said chamber and including a rigid bracket located outside said chamber and connected to said keyboard tray within said chamber by a rigid member protruding through said open space; and
   d) a fastener releasably attached between said bag and said bracket to releasably attach said bag to said bracket and keyboard tray.

2. The combination of claim 1, wherein said bag is generally rectangular.

3. The combination of claim 2, wherein said chamber is sized to receive said keyboard tray with a mouse pad attached thereto.

4. The combination of claim 3, said fastener including a first fastener half attached to said bag and a second fastener half attached to said bracket.

5. The combination of claim 3, wherein said bracket comprises first and second bracket arms articulated at a pivot.

6. The combination of claim 5, wherein said keyboard tray is attached to said second bracket arm, said first bracket arm including a demonstration bracket fastened thereto.

7. The combination of claim 6, wherein said second fastener half of said first fastener is attached to said demonstration bracket.

8. The combination of claim 1, wherein said bag is made of a padded cloth material.

9. The combination of claim 1, said fastener comprising a first fastener and wherein said flap is attached to said bottom portion, said top portion having a pair of first fastener halves attached thereto, each of said flap portions having attached thereto a second fastener half, said first and second fastener halves being coupleable together respectively to form second and third fasteners when said flap portions are moved to said second position of said flap.

10. In a bracket system including first and second bracket arms articulated at a pivot, said first bracket arm having a demonstration bracket fastened thereto, said second bracket arm having a keyboard tray fastened thereto, the improvement comprising a protective cover for said keyboard tray, comprising:
   a) a flexible bag having top and bottom portions connected together to define an inner chamber sized to receive said keyboard tray through a chamber opening;
   b) a flap attached to one of said top and bottom portions and movable between a first position permitting access to said chamber via said opening and a second position overlying said opening to close said chamber, said flap comprising first and second flap portions separated by an open space;
   c) said keyboard tray being received within said chamber and said first bracket arm extending through said open space and outside said chamber; and
   d) a fastener on said bag releasably attachable between said bag and said bracket system comprising a first fastener half attached to said bag and a second fastener half attached to said demonstration bracket.

11. The bracket system of claim 10, wherein said chamber is sized to receive said keyboard tray with a mouse pad attached thereto.

12. The bracket system of claim 11, wherein said bag is generally rectangular.

13. The bracket system of claim 10, wherein said bag is made of a padded cloth material.

14. The bracket system of claim 10, said fastener comprising a first fastener and wherein said flap is attached to said bottom portion, said top portion having a pair of first fastener halves attached thereto, each of said flap portions having attached thereto a second fastener half, said first and second fastener halves being coupleable together to form second and third fasteners when said flap portions are moved to said second position of said flap.

15. The bracket system of claim 14, wherein said second fastener half of said first fastener includes two flexible tangs insertable within a recess in said first fastener half of said first bracket.

\* \* \* \* \*